(12) United States Patent
Couwenhoven et al.

(10) Patent No.: US 7,652,795 B2
(45) Date of Patent: Jan. 26, 2010

(54) REDUCING INK BLEED ARTIFACTS

(75) Inventors: Douglas W. Couwenhoven, Fairport, NY (US); Kevin E. Spaulding, Spencerport, NY (US); Gustav J. Braun, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 843 days.

(21) Appl. No.: 11/295,217

(22) Filed: Dec. 6, 2005

(65) Prior Publication Data
US 2007/0126792 A1 Jun. 7, 2007

(51) Int. Cl.
G06F 15/00 (2006.01)
G06K 1/00 (2006.01)
G06T 5/00 (2006.01)
H04N 1/407 (2006.01)
H04N 1/409 (2006.01)
G03F 3/08 (2006.01)

(52) U.S. Cl. .................. 358/3.26; 358/1.2; 358/518; 382/167

(58) Field of Classification Search .......... 358/1.9, 358/3.26, 515, 523, 534, 1.2, 518; 347/15; 382/167
See application file for complete search history.

(56) References Cited

U.S. PATENT DOCUMENTS

| 5,168,552 | A | 12/1992 | Vaughn et al. |
| 5,428,377 | A | 6/1995 | Stoffel et al. |
| 5,537,495 | A * | 7/1996 | Overton ............ 382/269 |
| 5,568,169 | A | 10/1996 | Dudek et al. |
| 5,570,118 | A | 10/1996 | Rezanka et al. |
| 5,596,355 | A | 1/1997 | Koyama et al. |
| 5,635,967 | A | 6/1997 | Klassen |
| 5,699,492 | A | 12/1997 | Karaki |
| 5,751,310 | A | 5/1998 | Yano et al. |
| 5,809,215 | A | 9/1998 | Heydinger et al. |
| 5,933,577 | A * | 8/1999 | Naitoh et al. ............ 358/1.9 |
| 5,975,678 | A | 11/1999 | Kanematsu et al. |
| 5,992,971 | A | 11/1999 | Takahashi et al. |
| 6,007,182 | A | 12/1999 | Matsubara et al. |
| 6,015,206 | A | 1/2000 | Heydinger et al. |
| 6,118,548 | A | 9/2000 | Ryan |
| 6,164,756 | A | 12/2000 | Takahashi et al. |
| 6,259,536 | B1 | 7/2001 | Coleman |
| 6,270,186 | B1 | 8/2001 | Smith et al. |
| 6,312,102 | B1 | 11/2001 | Moriyama et al. |
| 6,361,144 | B1 | 3/2002 | Torpey et al. |
| 6,412,938 | B1 | 7/2002 | Markham et al. |
| 6,821,787 | B2 * | 11/2004 | Neilson et al. ............ 436/149 |
| 2004/0114158 | A1 | 6/2004 | Klassen et al. |
| 2006/0238555 | A1 | 10/2006 | Couwenhoven et al. |

FOREIGN PATENT DOCUMENTS

EP 0 697 784 2/1996

\* cited by examiner

*Primary Examiner*—James A Thompson
(74) *Attorney, Agent, or Firm*—Raymond L. Owens

(57) ABSTRACT

A method for modifying an input digital image having one or more color channels, each color channel having an (x,y) array of image pixel values, to form a modified digital image so that when the modified digital image is used to produce a printed image on an inkjet printer there are reduced ink bleed artifacts.

29 Claims, 10 Drawing Sheets

| CMY | COLOR NAME | VALUE |
|---|---|---|
| 000 | WHITE | 1.0 |
| 001 | YELLOW | 1.3 |
| 010 | MAGENTA | 1.2 |
| 011 | RED | 1.4 |
| 100 | CYAN | 0.9 |
| 101 | GREEN | 0.9 |
| 110 | BLUE | 1.0 |
| 111 | BLACK | 1.0 |

REDUCING INK BLEED ARTIFACTS

CROSS REFERENCE TO RELATED APPLICATIONS

Reference is made to commonly assigned U.S. patent application Ser. No. 11/114,530 filed Apr. 26, 2005 by Couwenhoven, et al., the disclosure of which is herein incorporated by reference.

FIELD OF THE INVENTION

This invention pertains to the field of inkjet printing systems, and more particularly to a method for reducing ink bleed artifacts.

BACKGROUND OF THE INVENTION

Ink jet printers have become a very common way for printing images from a computer. Ink jet printers work by spraying small drops of colorants (ink) onto a receiver to form an image. Typically, ink jet printers use four or more different colors of colorants to produce colored images. Most commonly cyan (C), magenta (M), yellow (Y), and black (K) colorants are used. Sometimes additional colorants such as red, green, blue, orange, light cyan, or light magenta are also used. A given set of colorants, together with the writing system used to spray the ink on the receiver, will have an associated color gamut, which is defined to be the set of colors that can be made using the printer. The different colors within the color gamut can be made by adjusting the amounts of the various colorants that are applied in a given region of the print.

One problem that has been common in ink jet printers is an artifact commonly referred to as "ink bleed." Ink bleed occurs when ink that is sprayed on the receiver in one location spreads laterally on the page to a region where it is not wanted. Ink bleed can result if too much ink is applied to the page in a given location such that the receiver cannot absorb the ink and it forms a puddle on the surface, which can then seep laterally.

Another source of bleed is due to differences in the chemical formulations of the inks. Typically, the chemical formulations of black inks are quite different than the chemical formulations of the colored inks. These differences can make the image particularly susceptible to bleed at interfaces between regions where black ink is applied, and regions where colored ink is applied. An example of this would be printing black text on a yellow background, or printing a pie chart having colored segments with a black border. An illustration of such an interface is shown in FIG. 1A. Here a first region 10 comprised of a large amount of black ink is adjacent to a second region 11 comprised of a large amount of colored ink, such as cyan, magenta, or yellow. The term "large amount" refers to an amount of ink sufficient to result in bleed artifacts. FIG. 1B illustrates the appearance of ink bleed artifacts 13 that can occur at the interface between the first region 10 and the second region 11. In this example, the black ink from the first region 10 can be seen to have seeped into the colored ink in the second region 11. However, bleed can also happen in the reverse direction as well. Often the bleed artifacts 13 take the form of small "fingers" of ink that grow out from one region to the other.

It is also common for the colored inks to have quite different chemical formulations from each other, resulting in a variation of the bleed artifacts from color to color. For example, the bleed artifacts between black and cyan may be of lesser magnitude than the bleed artifacts between black and yellow, due to differences between the chemical formulations of the cyan and yellow ink.

There have been a number of approaches disclosed in the prior art to address this problem. In U.S. Pat. No. 5,168,552, Vaughn et al. disclose a method where composite black is changed to true black ink except when black dots are within a minimum spacing from color dots.

In U.S. Pat. No. 5,428,377, Stoffel et al. discloses a method for adjusting what ink(s) are used to print black image areas depending on whether the surrounding pixels contain black, colored, or blank content.

In U.S. Pat. No. 5,568,169, Dudek et al. discloses a method for adjusting usage of slow- and fast-drying black inks depending on whether the surrounding pixels contain any colored inks. The slow-drying ink is either totally replaced, or is selectively replaced.

In U.S. Pat. No. 5,570,118, Rezanka et al. discloses a method for reducing ink bleed by producing a small gap between a slow-drying black ink region and a fast-drying color inks region. In one embodiment, the gap is filled in with a fast-drying second black ink.

In U.S. Pat. No. 5,596,355, Koyama et al. discloses a dot judgment circuit for determining whether to print black pixels using a slow-drying black ink or fast-drying colored inks depending on whether color image content is surrounding the black pixels.

In. U.S. Pat. No. 5,635,967, Klassen discloses a method for reducing ink bleed for a binary image that involves blurring the binary image to form a continuous tone image, detecting edges in the continuous tone image, and reducing the number of pixels printed on the edge in the original binary image.

In U.S. Pat. No. 5,699,492, Karaki discloses a method for changing from pure black pixels to composite black pixels for black areas that are in contact with color areas.

In U.S. Pat. No. 5,751,310, Yano et al. discloses a method for replacing black ink with a process black in a border region where black and colored regions are adjacent. The border region is detected using an expansion operation.

In U.S. Pat. No. 5,809,215, Heydinger et al. discloses a method for reducing ink bleed whereby black pixels are altered when a certain fraction of nearby pixels contain colored ink. Methods for altering the black pixels include removing selected pixels or removing all of the pixels.

In U.S. Pat. No. 5,975,678, Kanematsu et al. disclose a method for selectively replacing black ink with colored inks depending on the proximity to colored regions. The degree of proximity is determined by doing a weighted sum according to an array of distance-weighted coefficients. Depending on the degree of proximity, more or less ink is substituted.

In U.S. Pat. No. 5,992,971, Takahashi et al. discloses a method whereby ratio of black and colored is adjusted according to the color content of nearby marginal pixels. In some embodiments, the amount of adjustment is dependent on the distance between the current pixel and the marginal pixel.

In U.S. Pat. No. 6,007,182, Matsubara et al. discloses a method for adjusting what ink(s) are used to print black image areas depending on whether any surrounding pixels contain colored image data. In areas adjacent to colored regions, black is made using CMY inks. Otherwise, black ink is used.

In U.S. Pat. No. 6,015,206, Heydinger et al. discloses a method where ink bleed is reduced by printing process black and black ink in an alternating pattern for dots on the boundary between black regions and color regions.

In U.S. Pat. Nos. 6,084,604 and 6,312,102, Moryiama et al. discloses a method for adjusting what ink(s) are used to print black image areas depending on whether any surrounding pixels contain colored image data. In areas adjacent to colored regions, black is made using CMY inks, and using black ink elsewhere.

In U.S. Pat. No. 6,118,548, Ryan discloses a method for replacing black ink with a process black for regions near colored pixels. A logical search sequence is used to identify the nearest colored pixel.

In U.S. Pat. No. 6,164,756, Takahashi et al. discloses a method for reducing bleed by using a multipass mode for image regions where a boundary between a black image region and a colored image region is detected, and a faster single pass mode otherwise.

In U.S. Pat. No. 6,259,536, Coleman discloses a method for determining whether to use black ink or process black to print a black object depending on whether the black object is on a colored background.

In U.S. Pat. No. 6,270,186, Smith et al. discloses a method for reducing ink bleed in a multilevel ink jet printer capable of printing multiple numbers of drops at a given pixel location by reducing the number of pixels printed with more than one drop in a black/colored border region.

In U.S. Pat. No. 6,361,144, Torpey et al. discloses a method for reducing intercolor bleed using a color pixel modification pattern to remove a fraction of the color pixels near a color/black boundary, and using a black pixel modification pattern to replace black ink pixels near a boundary with colored inks.

In U.S. Pat. No. 6,412,938, Markham et al. discloses a method whereby bleed is reduced by printing black ink in a multipass mode using a larger print head, and colored inks are printed in a single-pass mode.

In U.S. Patent Application Publication 2004/0114158 A1, Klassen, et al. discloses a way for intercolor bleed reduction in liquid ink printers which uses an edge detection operation to find edges in the image and determines a reduction factor for edge pixels based on the ink coverage level.

SUMMARY OF THE INVENTION

It is an object of the present invention to reduce bleed artifacts in ink jet printers. It is a further object of the present invention to do this in a computationally efficient manner that can be readily adjusted to account for differences in ink, media and printer characteristics. It is yet another object of the present invention that the bleed artifacts are variably corrected according to the mixture of ink colors printed on the page.

These objects are achieved by modifying an input digital image having one or more color channels, each color channel having an (x,y) array of image pixel values, to form a modified digital image comprising the steps for:

a) computing a transformed digital image responsive to the input digital image, wherein the transformed digital image contains at least a black color channel and one or more additional color channels, each such channel having pixel values;

b) computing a color dependent scale factor channel responsive to the image pixel values of the transformed digital image to produce color dependent scale factor image pixel values;

c) computing a filtered black color channel from the black color channel using a convolution operation to produce filtered black image pixel values; and d) forming the modified digital image by modifying image pixel values in one or more of the additional color channels of the transformed digital image in response to the corresponding color dependent scale factor image pixel values and the corresponding filtered black image pixel values, so that when the modified digital image is used to produce a printed image on an inkjet printer there are reduced ink bleed artifacts.

ADVANTAGES

This invention has the advantage that it reduces objectionable bleed artifacts associated with ink jet printers in a computationally simple and efficient manner. It has the additional advantage that the method uses a tunable configuration that can be optimized for different ink/media characteristics.

Another advantage is that the magnitude of correction is adaptively adjusted according to the amount of ink used at the boundary between a black and colored region in order to avoid the appearance of halo artifacts. Yet another advantage is that the magnitude of correction is adaptively adjusted according to the color of the ink mixture used at the boundary between a black and colored region, thereby minimizing bleed and halo artifacts over the entire color range.

DETAILED DESCRIPTION OF THE INVENTION

Figure 1A:
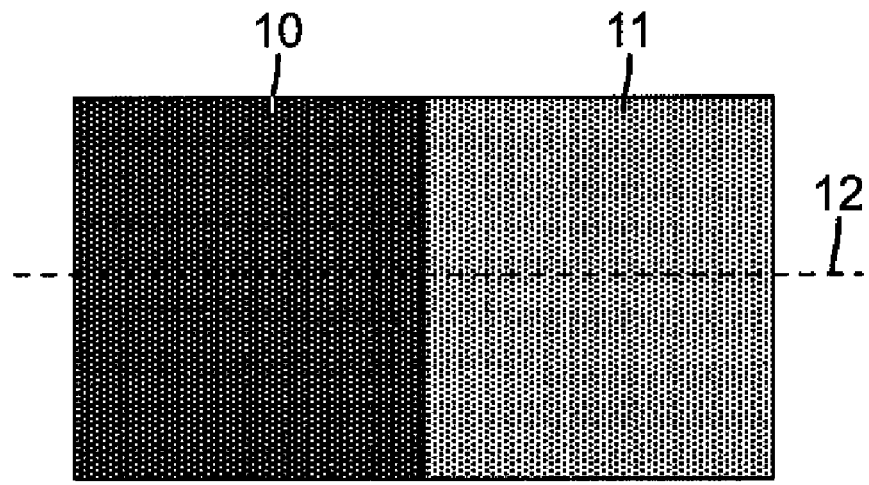
FIG. 1A illustrates a boundary between black and colored ink patches.
Figure 1B:
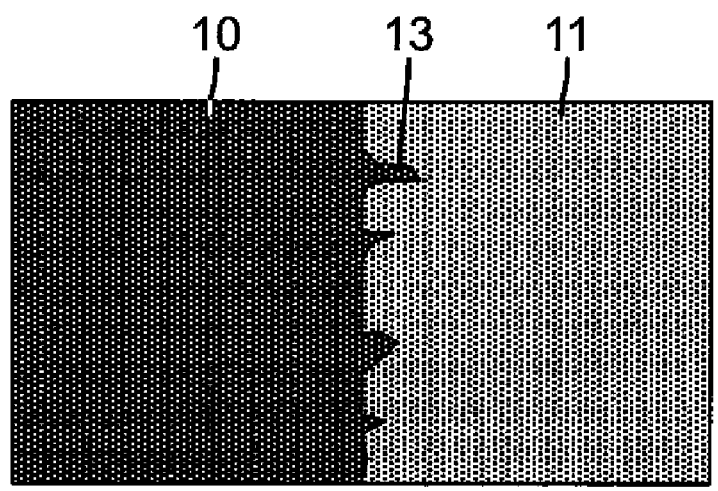
FIG. 1B illustrates the appearance of ink bleed artifacts.

The present invention will now be described with reference to the flow diagram given in FIG. 5. An input digital image 50, which is typically represented by red, green, and blue color channels, is processed by a color transform operation 58 to produce a black color channel 51 corresponding to a black colorant, and one or more additional color channels 52 corresponding to additional colorants, each channel having pixel values. In ink jet printers, such colorants are referred to as inks. The black color channel 51 is processed using a convolution operation 53 to form a filtered black color channel 54 having filtered black image pixel values. A form color dependent scale factor channel step 59 is then used to form a color dependent scale factor channel 60 having color dependent scale factor image pixel values. A form modified additional color channels step 55 is then used to modify one or more of the additional color channels 52 in response to the filtered black color channel 54 and the color dependent scale factor channel 60 to form a set of modified additional color channels 56. The original black color channel 51, together with the modified additional color channels 56 comprise a modified digital image 57, the modified digital image 57 having modified image pixel values being suitable for producing a printed image having reduced ink bleed artifacts on an inkjet printer. Each of the steps in the process described above will now be discussed in more detail.

Figures 3A, 3B:
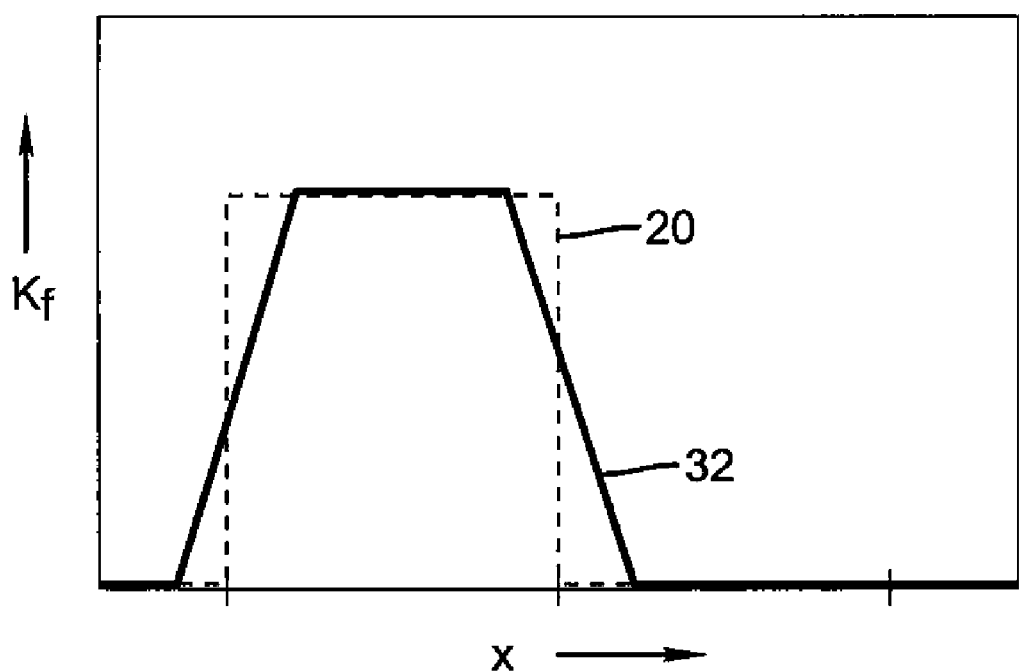
FIG. 3A shows a prior art typical low-pass convolution filter.
FIG. 3B shows a low-pass filtered black image cross-section.
Figure 5:
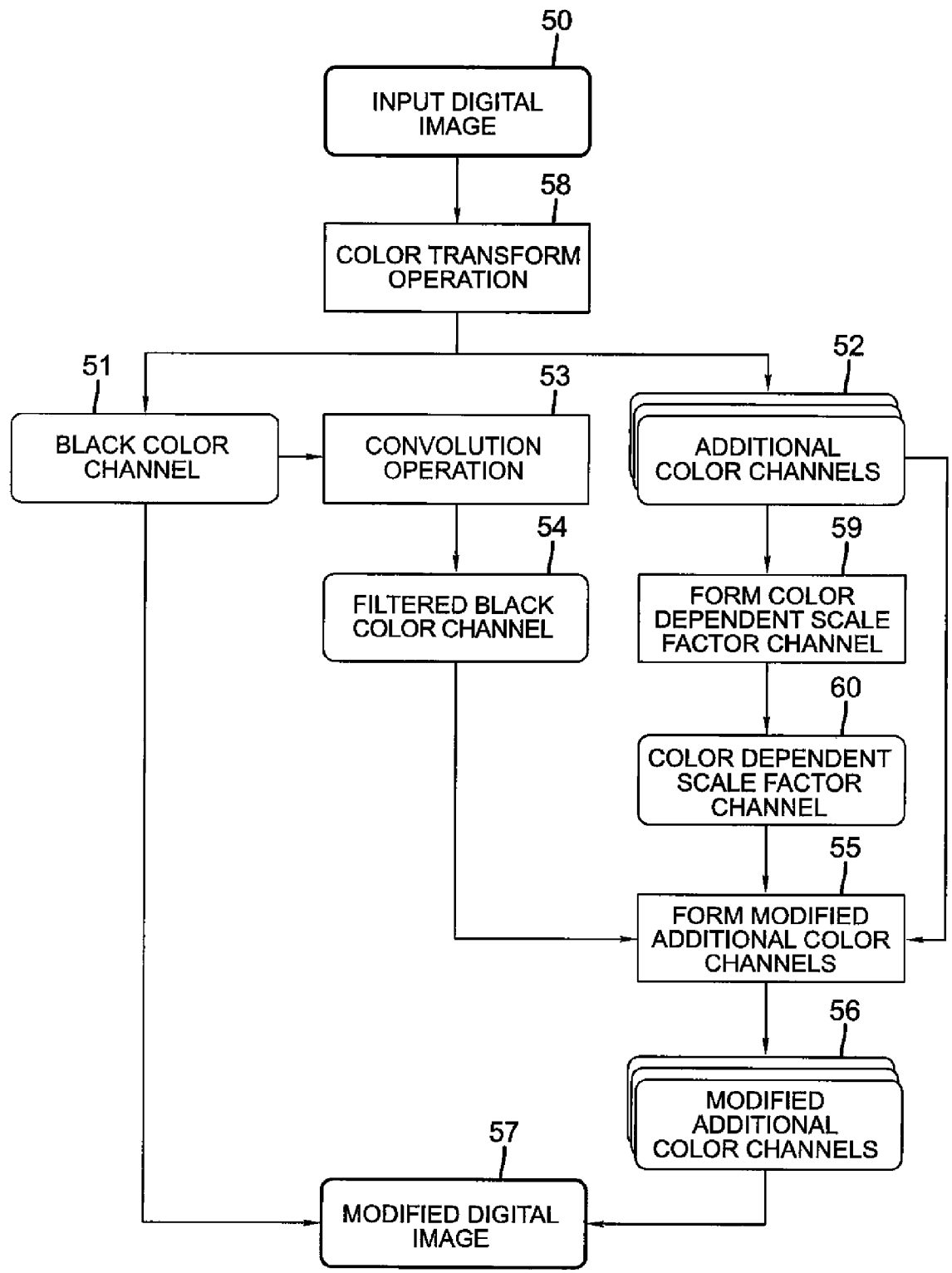
FIG. 5 is a flowchart illustrating the method of the present invention.

Referring to FIG. 5, the processing of the black color channel 51 will now be discussed. The black color channel 51 is processed by a convolution operation 53 to produce a filtered black color channel 54 having filtered black image pixel values. The purpose of this processing is to determine the proximity of a given pixel to a black edge. Pixels closer to a black edge will be more likely to bleed with the black ink, and therefore the amount of ink that is removed will be a function of the proximity of a given pixel to a black edge. The filter used in the convolution operation 53 can take a variety of forms within the scope of the invention, including low-pass and hi-pass convolution filters. A conventional low-pass convolution filter 30 is shown in FIG. 3A. In this example, the filter is a 5×5 "box filter." (A "box filter" is a simple filter where all of the filter coefficients are the same.)

Convolution operations are well known in the art, and in accordance with the present invention include calculations where a neighborhood of pixels around a center pixel are weighted by a matrix of filter coefficients to determine a filtered pixel value, or mathematical equivalents thereof. As will be understood by one skilled in the art, the convolution operation 53 normalizes the convolution filter 30 so that the coefficients sum to unity, ensuring that the range of the filtered black color channel 54 matches the range of the black color channel 51.

Figure 2A:
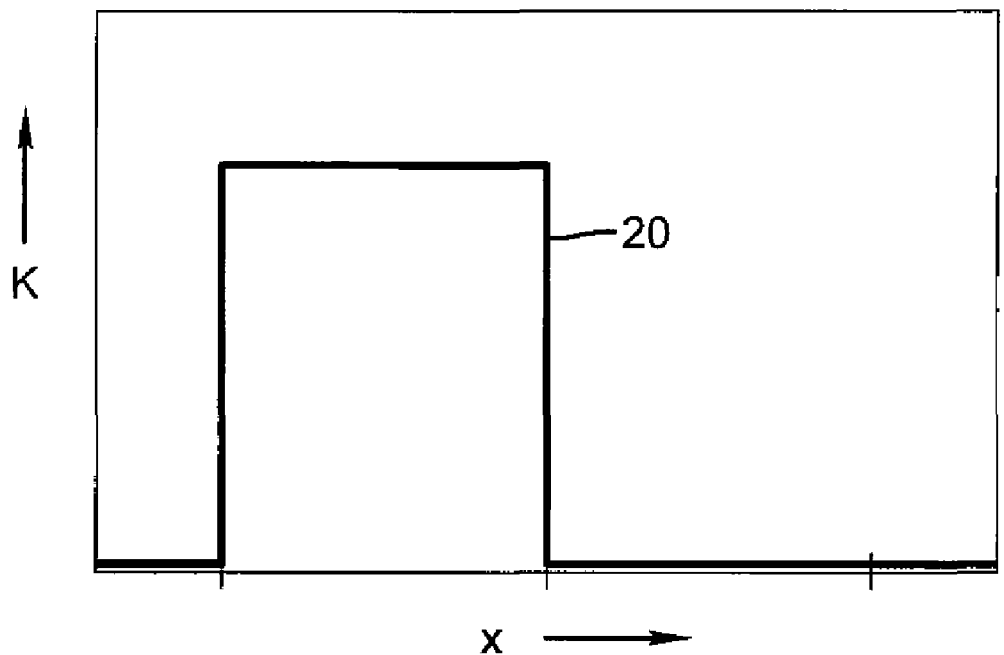
FIG. 2A shows a black input image cross-section.
Figure 2B:
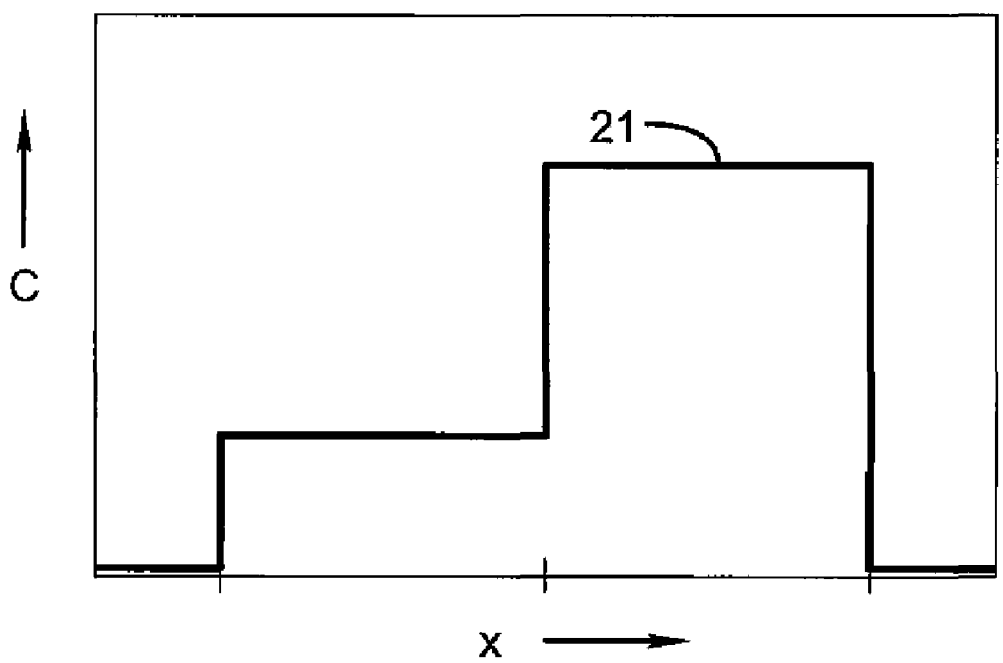
FIG. 2B shows a colored input image cross-section.

Consider the example image shown in FIG. 1A. Cross-sections through the image regions at the cross-section line 12 are shown in FIG. 2A and FIG. 2B. In this example, the first region 10 is a black patch comprised of a high-level of black ink, together with a lesser amount of cyan ink, and the second region 11 is a cyan patch comprised of a high-level of cyan ink, with no other inks. FIG. 2A illustrates the black input image cross-section 20, giving the image pixel values K for the black input color channel of the input digital image as a function of the position coordinate x. It can be seen that for the range of x values corresponding to the first region 10 the K values are large, and for the range of x values corresponding to the second region 11, the K values are zero. FIG. 2B illustrates the cyan input image cross-section 21, giving the image pixel values C for the cyan input color channel of the input digital image as a function of the position coordinate x. It can be seen that for the range of x values corresponding to the second region 11 the C values are large, and for the range of x values corresponding to the first region 10, the C values are smaller, but non-zero. Processing the black color channel of the example image with a low-pass convolution filter results in a filtered black color channel 54 having filtered black image pixel values where the black edges have been "blurred out" and broadened as shown by the low-pass filtered black image cross-section 32 in FIG. 3B. The broadening of the edge means that the magnitude of the filtered black color channel 54 can be used as an indicator of the proximity of a given pixel to an edge. Low values of the filtered black color channel 54 indicate that the given pixel is either far from a black edge, or near to a black edge of lower magnitude. In either case, the amount of bleed correction required is relatively small. Conversely, high values of the filtered black color channel 54 indicate that a given pixel is close to a strong black edge, and therefore a large amount of bleed correction would be required.

Figures 4A, 4B:
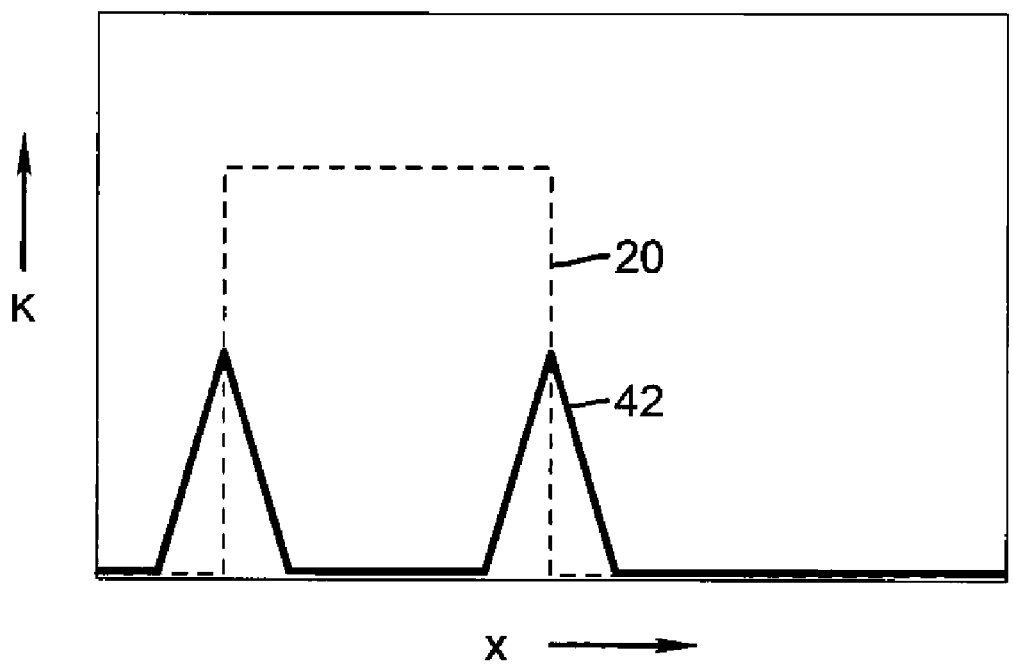
FIG. 4A shows a prior art typical hi-pass convolution filter.
FIG. 4B shows a hi-pass filtered black image cross-section.

The embodiment that was described hereinabove represents just one possible implementation of the convolution operation 53. There are many possible variations of this invention that will be obvious to one skilled in the art. For example, it can be desirable to reduce the amount of ink in the additional color channels near the edge of the boundary region where bleed is likely to occur, but to leave it unchanged in image regions away from the boundary region. Note that the value of the filtered black color channel $K_f$ is large for interior portions of the example image as shown in FIG. 3B, indicating that any colored ink that exists in the interior portion would be removed. This may not be desirable in all cases, since removing the colored ink from the first region 10 may result in an undesirable color shift. One way to prevent this in accordance with a preferred embodiment of the present invention is to use a different type of convolution filter, such as a conventional hi-pass convolution filter 40 as shown in FIG. 4A. A convolution operation that includes filtering the black color channel 51 using the hi-pass convolution filter followed by applying an absolute value operation can be also used to determine a given pixel's proximity to a black edge. An absolute value operation is a well known mathematical operator that returns the magnitude of its argument as a positive quantity. Applying the hi-pass convolution of FIG. 4A to the black channel of the example image results in the hi-pass filtered black image cross-section 42 as shown in FIG. 4B. The original black input image cross-section 20 is shown again for comparison. It can be seen that the effect of applying the hi-pass convolution filter 40 is basically to identify image regions near edges in the black color channel, and that the value of the filtered black color channel is low for interior portions of the first region 10, indicating that no modification of the additional color channels is desired. Once the filtered black color channel 54 is computed according to the processes described above, it is passed to the form additional modified color channels step 55, the details of which will be discussed later in this document.

Referring back to FIG. 5, the processing of the additional color channels 52 will now be discussed. The form color dependent scale factor channel step 59 is used to generate the color dependent scale factor channel 60 having color dependent scale factor image pixel values in response to the additional color channels 52. The color dependent scale factor channel 60 is used (in addition to the filtered black color channel 54) to reduce the amount of ink that is present to control bleed artifacts, based on how much total ink is present, and what specific color the ink mixture represents. The generation and usage of the color dependent scale factor channel 60 will be discussed in detail hereinbelow.

Figure 6:
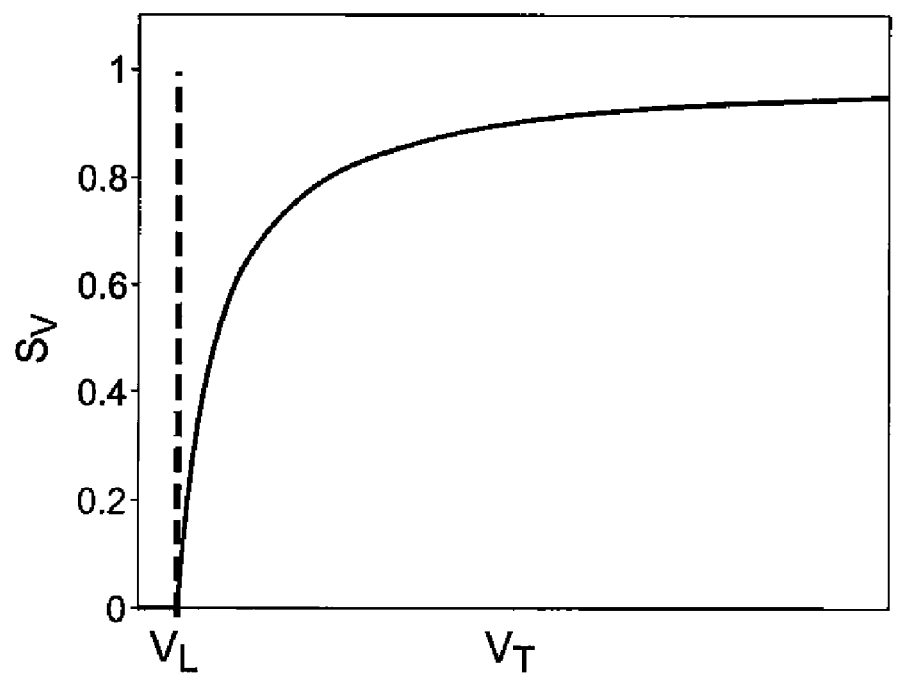
FIG. 6 is a plot of a typical volume tapering function.
Figures 9, 10:
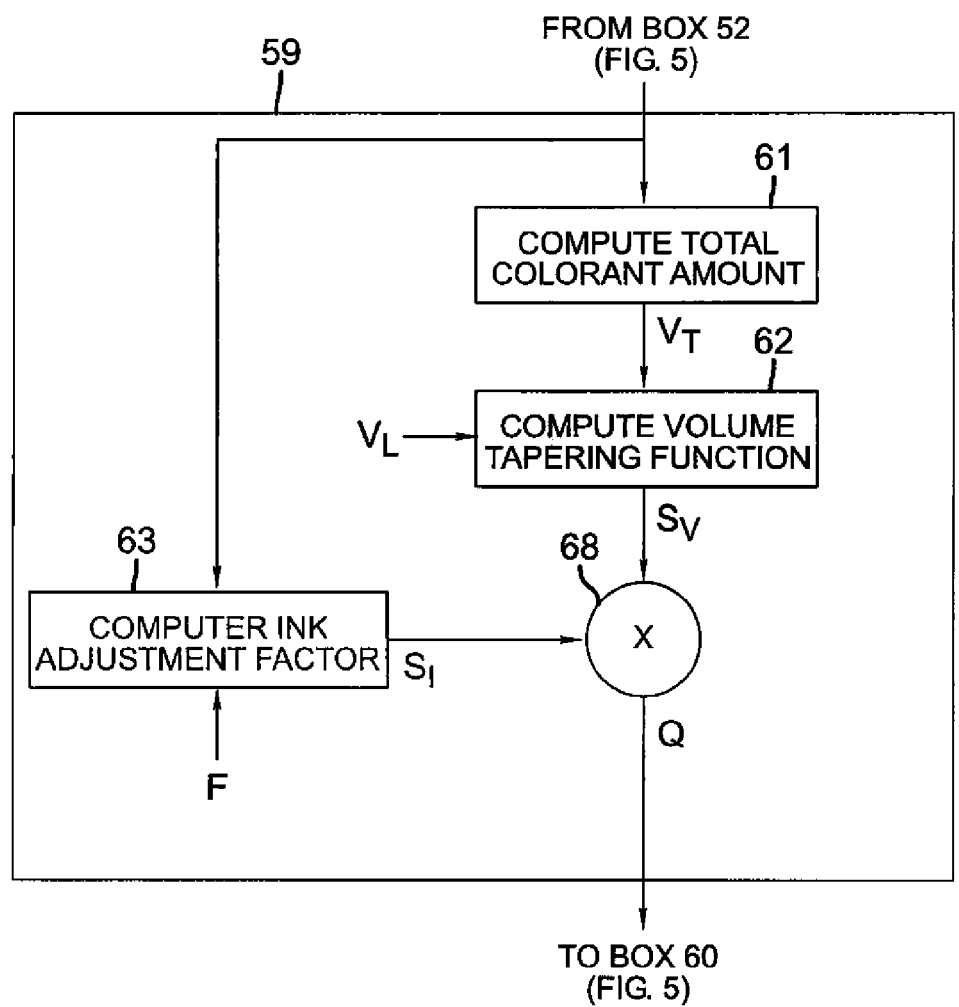
FIG. 9 is a flowchart illustrating an embodiment of the form color dependent scale factor channel step.
FIG. 10 is a table showing ink adjustment factor data.

Referring to FIG. 9, the details of the form color dependent scale factor channel step 59 of FIG. 5 are shown according to a preferred embodiment of the present invention. In this arrangement, it is desired to limit the total ink fluid amount, or ink colorant amount, of the modified additional color channels 56 to be less than or equal to a total colorant amount limit $V_L$ for pixels near a black edge. As discussed earlier, the filtered black color channel 54 is used to determine the proximity of a given pixel to a black edge, and the processing of the additional color channels dictates how much ink will be removed for pixels adjacent to the edge. The total colorant amount limit $V_L$ is determined experimentally for a given ink and media combination, and set to a value that substantially prevents ink bleed artifacts from occurring for most colors. In many cases, it is not necessary to remove all of the colored ink next to a black edge to significantly reduce ink bleed artifacts, and as such the value of $V_L$ will generally be >0. A total colorant amount, $V_T$, is computed for a given pixel of the image by summing the colorant amounts for the one or more additional color channels according to a compute total colorant amount step 61. A volume tapering function $S_V(V_T)$ is then computed using a compute volume tapering function step 62 according to $$S_V(V_T) = \text{Clip}(1 - V_L/V_T, 0, 1)$$

where $V_L$ is the predetermined colorant amount limit described above, and Clip(A,min,max) is a function that clips the value of the argument A to the range between min and max. Thus, the volume tapering function $S_V(V_T)$ indicates how much colorant should be removed from a given pixel to satisfy the colorant amount limit, $V_L$. A plot of the volume tapering function $S_V(V_T)$ is shown in FIG. 6. Note from the plot of FIG. 6 that when $V_T < V_L$, the total colorant amount limit is already satisfied and the value of the volume tapering function $S_V(V_T)$ is 0, indicating that no colorant needs to be removed from the pixel. When $V_T > V_L$, the value of the volume tapering function $S_V(V_T)$ increases proportionally, indicating the fraction of the total colorant amount $V_T$ that is required to be removed to satisfy the colorant amount limit $V_L$. The volume tapering function as described above specifies a "nominal" correction to be applied for a pixel adjacent to a black edge. This nominal correction is modified (reduced) with increasing distance from the black edge (as determined by the filtered black color channel discussed earlier), and is further modified depending on the specific mixture of ink colors that is present at the pixel, as will be discussed next.

Referring again to FIG. 9, a compute ink adjustment factor step 63 is used to compute an ink adjustment factor $S_I$ from the pixel values of the additional color channels and ink adjustment data F. In a preferred embodiment of the present invention, the ink adjustment data F includes a multidimensional look-up table of values corresponding to the possible combinations of the additional inks, where the table value specifies an ink adjustment factor corresponding to the given ink combination. For example, if the additional color channels are C, M, and Y, then the ink adjustment data F includes a $2^3$ table of ink adjustment values. An example table is shown in FIG. 10. In this example table, the ink adjustment value for Y, M, and R (=M+Y) is >1, indicating that these ink combinations bleed more severely with the black ink. Conversely, the ink adjustment values for C and G(=C+Y) are <1, indicating that these ink combinations bleed less severely. The ink adjustment value for B (=C+M) is equal to 1, indicating that no "fine adjustment" is required for this combination over the nominal correction amount. The ink adjustment factor $S_I$ for the given input color is determined from the ink adjustment table using tetrahedral interpolation based on the digital code values of the additional color channels. One skilled in the art will understand the concept of tetrahedral interpolation of a multidimensional look-up table, and that other interpolation techniques could be used as well within the scope of the invention. One skilled in the art will appreciate that a multi-dimensional look-up table can be stored as a set of discrete nodes that can be interpolated using a number of well known methods, and that it is also possible within the scope of the present invention to compute the ink adjustment factor $S_I$ using a variety of other mathematical techniques, including polynomial models and the like.

Still referring to FIG. 9, the ink adjustment factor $S_I$ is then multiplied by the volume tapering function $S_V(V_T)$ using a multiplier 68 to produce the color dependent scale factor (Q) according to:

$$Q = \text{Clip}(S_I \times S_V(V_T), 0, 1)$$

As discussed earlier, the volume tapering function $S_V(V_T)$ supplies a nominal amount of correction based on the total volume of ink present and the colorant amount limit, $V_L$, and the ink adjustment factor $S_I$ supplies a "fine adjustment" of the amount of correction based on the color of the ink mixture that is present. This provides for a large degree of flexibility, and the ability to specifically tune the amount of bleed artifact correction for each printable color, thereby providing a substantial improvement relative to the prior art.

Returning to FIG. 5, after the color dependent scale factor channel 60 is formed, the form modified additional color channels step 55 is used to modify the additional color channels 52 in response to the filtered black color channel 54 and the color dependent scale factor channel 60 to form a set of modified additional color channels 56 having modified image pixel values. The details of this process will now be described hereinbelow.

Removing the amount of colorant specified by the volume tapering function $S_V(V_T)$ will result in the prevention of bleed artifacts for pixels immediately adjacent to a black edge, but pixels farther away from the edge are less susceptible to bleeding, and do not require as much colorant to be removed. Thus, an edge tapering function, $S_E(K_f)$, is employed to reduce the amount of colorant that is removed for pixels that are farther from the black edge, as described below.

Figure 7:
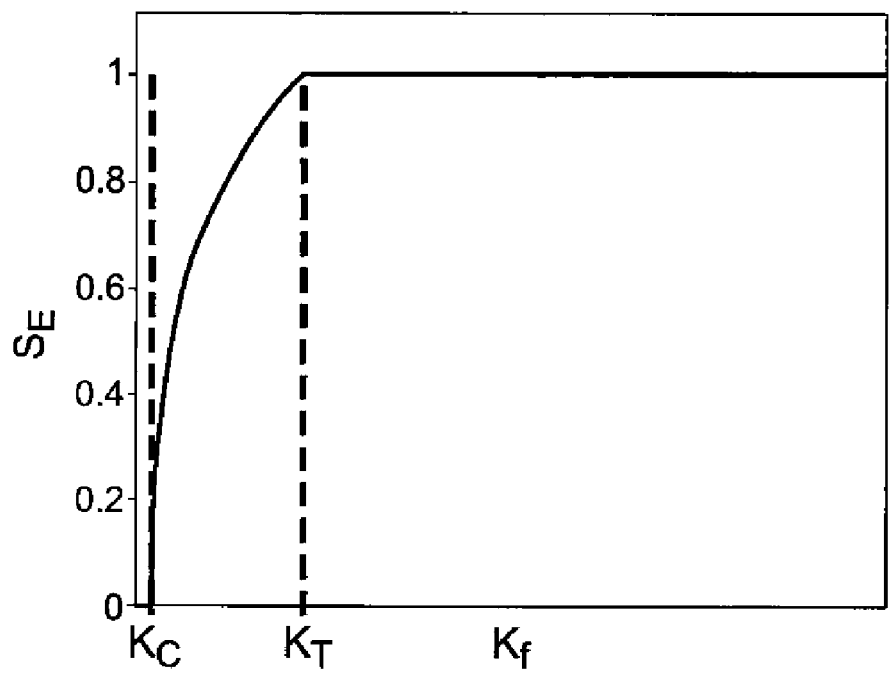
FIG. 7 is a plot of a typical edge tapering function.
Figure 8:
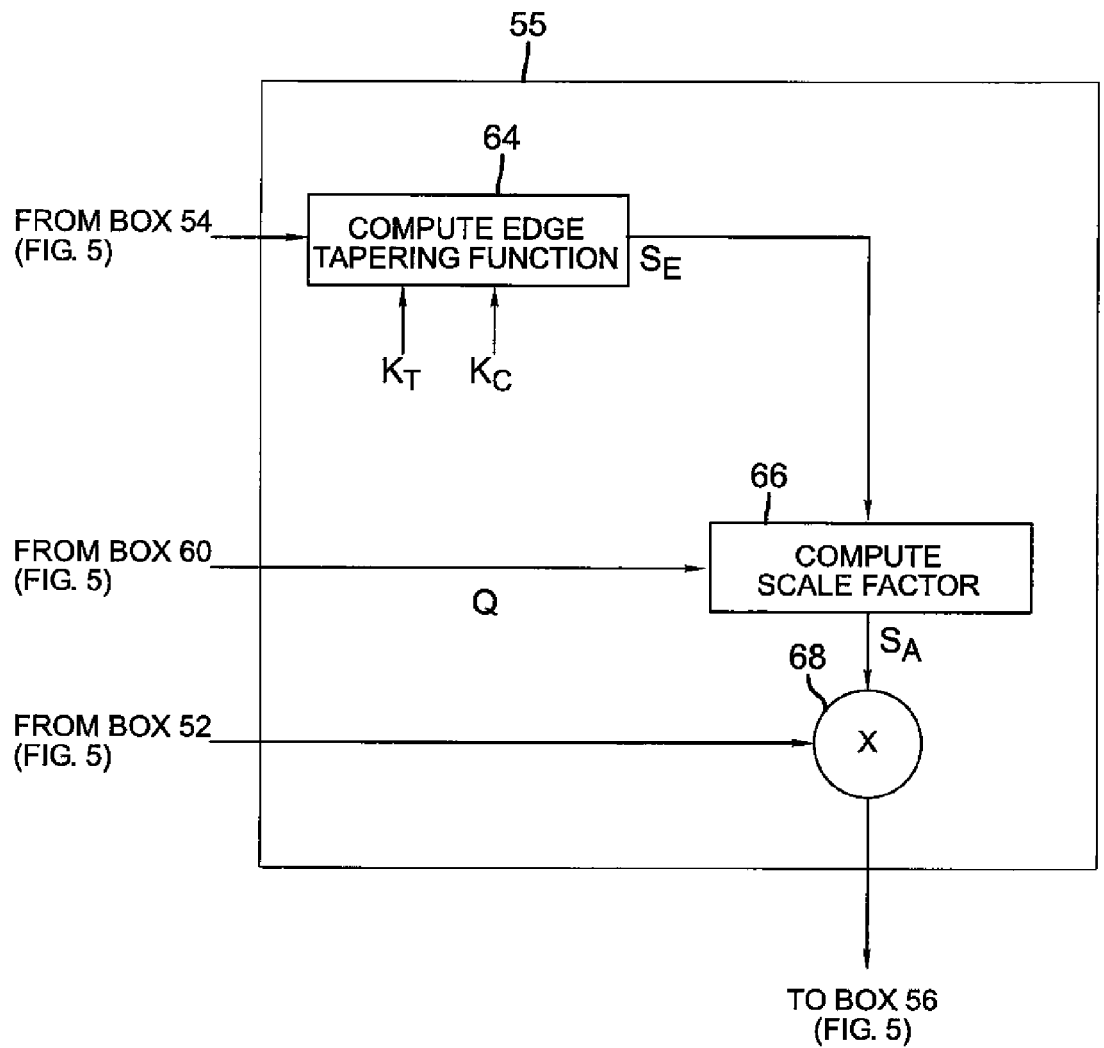
FIG. 8 is a flowchart illustrating an embodiment of the form modified additional color channels step.

Referring to FIG. 8, the details of the form modified additional color channels step 55 of FIG. 5 according to a preferred embodiment will now be discussed. In this arrangement, the bleed control aspects of the edge tapering function and the color dependent scale factor channel 60 are combined and applied to the additional color channels 52 to produce the modified additional color channels 56. The edge tapering function ($S_E$) is computed using a compute edge tapering function step 64 according to $$S_E(K_f) = \left(\frac{K_f - K_c}{K_T - K_c}\right)^p$$

where $K_f$ is the filtered black image pixel value described above, p is an exponent that controls the shape of the edge tapering function, $K_T$ is a threshold parameter, and $K_c$ is a coring parameter. A plot of the edge tapering function, $S_E(K_f)$ is shown in FIG. 7. As can be seen from the plot, the threshold parameter $K_T$ sets the value of the filtered black image pixel at which it is required that the most ink be removed. Thus, the closer one gets to a black edge (or the magnitude of a black edge increases) the value of $K_f$ will increase, and it is desired to remove more ink. This is indicated by the generally increasing nature of the edge tapering function, $S_E(K_f)$. As can also be seen from the plot of FIG. 7, the coring parameter $K_c$ sets the point at which the edge tapering function $S_E(K_f)$ becomes non-zero. This parameter is used to prevent removing ink from the one or more additional color channels when the value of $K_f$ is very small. Small values of $K_f$ will indicate that the pixel is either far from a black edge, or the magnitude of the black edge is small. In these cases, it is not generally required to remove any ink to prevent bleed artifacts.

Still referring to FIG. 8, a compute scale factor step 66 is used to combine the behavior of the color dependent scale factor Q 60 and the edge tapering function $S_E(K_f)$ to produce the pixel-dependent scale factor for the additional color channels $S_A$, according to the equation below $$S_A = 1 - Q \times S_E(K_f).$$

The additional color channels 52 are then multiplied by the pixel-dependent scale factor $S_A$ using a multiplier 68 to form the modified additional color channels 56. The modified additional color channels are then combined with the black color channel 51 to form the modified digital image 57 as shown in FIG. 5. The pixel dependent scale factor $S_A$ combines aspects of bleed control based on the proximity of a pixel to a black edge, the total amount of colorant present at the pixel relative to a colorant amount limit, and the specific mixture of ink colors present at the pixel to provide to a high degree of flexibility in tuning to prevent bleed artifacts across a wide range of colors and printing conditions.

Figure 11:
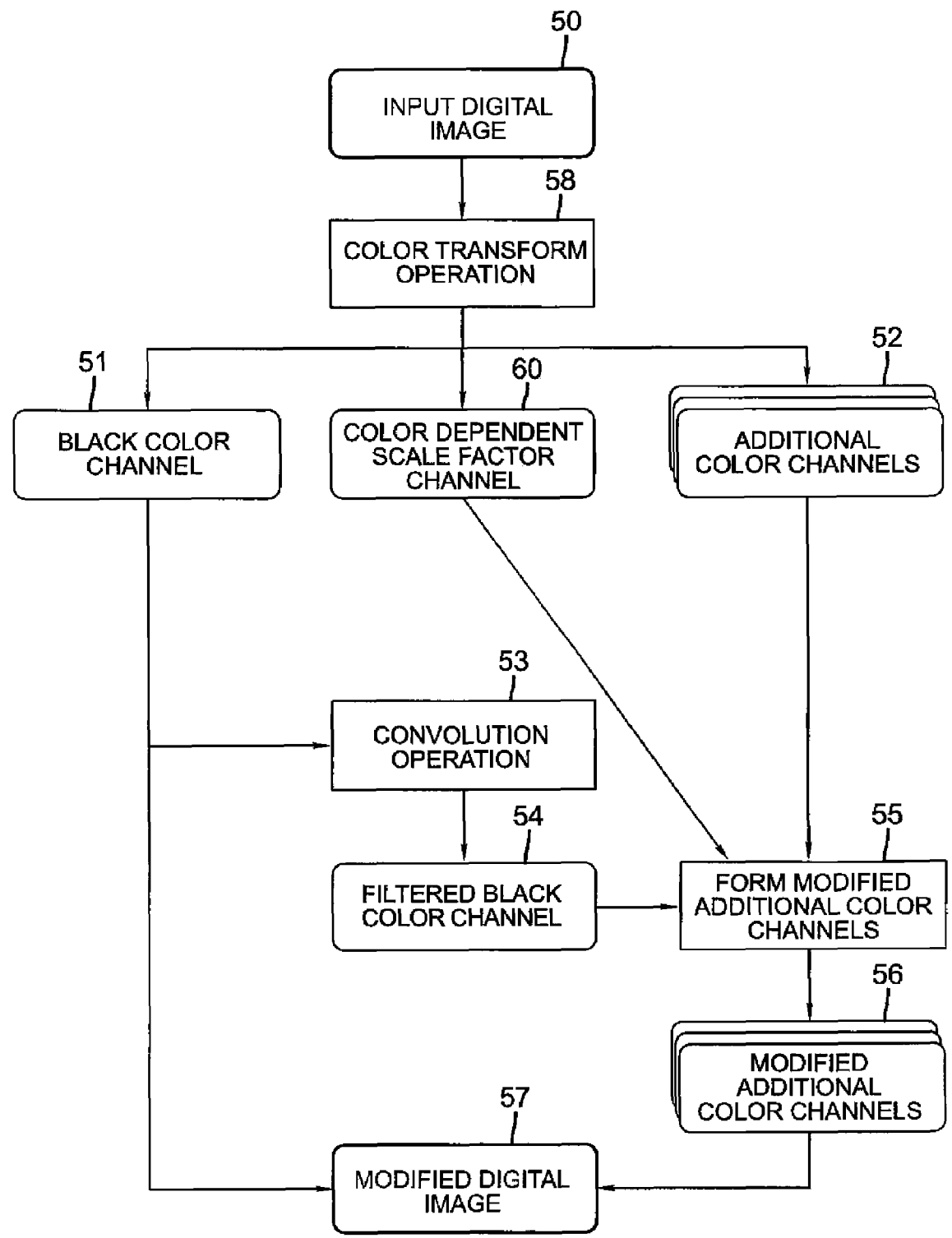
FIG. 11 is a flowchart illustrating another method of the present invention.

Turning now to FIG. 11, another embodiment of the present invention will be described. In this embodiment, the color transform operation 58 generates the black color channel 51, additional color channels 52, and the color dependent scale factor channel 60 directly. This arrangement is advantageous in that the color dependent scale factor channel 60 is pre-computed and stored as an additional channel of a multidimensional color table used in the color transform operation 58. This provides for an improvement in computational efficiency by reducing the number of calculations that are required to process the input digital image using the method of the present invention. This arrangement is possible since the only information required to generate the color dependent scale factor channel 60 is the digital code values of the additional color channels for the node points in the multidimensional color table, the total colorant amount $V_T$, the colorant amount limit $V_L$, and the ink adjustment data F. Since all of these parameters will be known to the system designer at the time that the multidimensional color table is created, then the color dependent scale factor 60 can be pre-computed and simply stored as an additional plane in the color table. The techniques of building and applying a multidimensional look-up table for use in the color transform operation 58 will be known to one skilled in the art.

Figure 12:
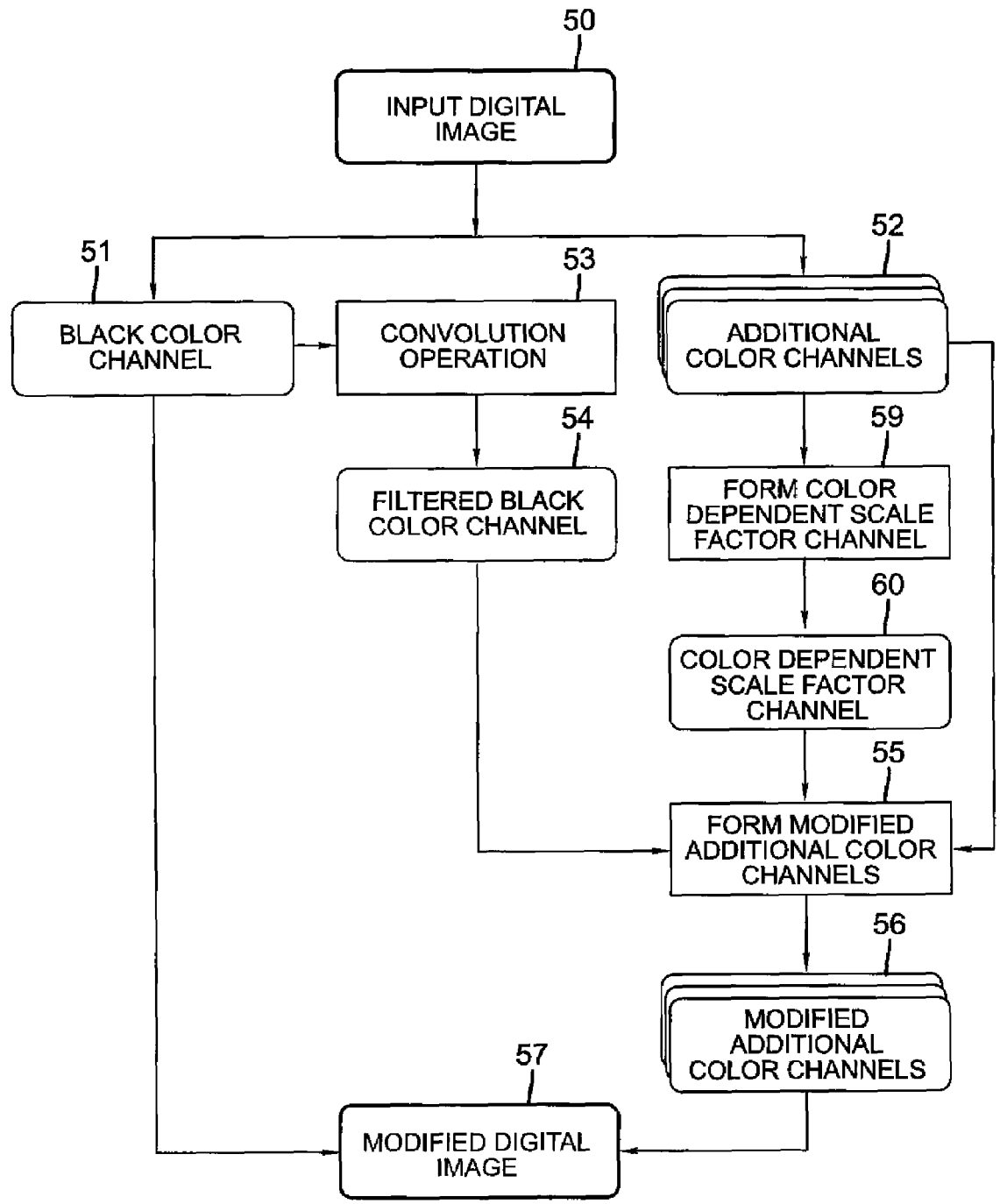
FIG. 12 is a flowchart illustrating another method of the present invention.

Turning now to FIG. 12, another embodiment of the present invention is shown in which the color transform operation is not required. In this arrangement, the method of the preferred embodiment as shown in FIG. 5 and described above is used, except that the input digital image 50 is already transformed into a black color channel 51 and additional color channels 52 by some prior process in the imaging chain, and therefore the color transform operation 58 as shown in FIG. 5 is not required. One skilled in the art will realize that the processing of the color transform operation 58 will be present in any image processing chain for an inkjet printer, and that the method of the present invention does not require the color transform operation 58, but that certain aspects of the color transform operation 58 can be used advantageously as described above and shown in FIG. 11.

There are many other variations of the present invention that can be applied by one skilled in the art. For example, experiments suggest that the severity of the bleed artifact correlates well with the total volume of ink present at the color/black ink boundary. Therefore, the total colorant amount $V_T$ can be calibrated using a calibration function such that it is linearly related to the total ink volume. This can be accomplished by a simple conversion between the pixel value of a given color channel to ink volume using some basic parameters of the printing system, such as the ink drop volume for each color ink, and the number of ink drops placed at each location. Such a conversion will be obvious to one skilled in the art.

Additionally, the method of the present invention can be employed to provide for modifying the black color channel in addition to the additional color channels. This can be accomplished by filtering the additional color channels using one of the filtering techniques described above. The filtered color channels can then be combined to form a second filtered color channel by summing the values of the filtered color channels. Another way to combine the filtered color channels would be to set the second filtered color channel value to the largest of the individual filtered color channel values. Then, in a similar fashion to the method described above, the second filtered color channel can be used to modify the black color channel using similar functions for the volume taper and edge taper functions described above.

In some applications, it can be advantageous to apply the method of the present invention to only certain regions of a document. For example, in a compound document containing text, graphics, and bitmap regions (i.e., digitized pictures), a time savings can be realized by applying the method of the present invention to only regions of the document containing text, graphics or both. An automatic detection algorithm can be used to segment the text, graphics, and bitmap portions of the document, and the detection signal used to control the processing such that the present invention is applied only to the text and graphics portions.

The embodiments of the present invention described above discuss computing scale factors or functions using a functional relationship having inputs including the corresponding image pixel values of the one or more additional input color channels and the image pixel value of the filtered black color channel. As will be understood by one skilled in the art, processing performance improvement can be achieved by precomputing such functional relationships and storing the result in one or more look-up table(s) (LUTs). The look-up tables can be addressed using the input values to determine the corresponding output values.

The invention has been described in detail with particular reference to certain preferred embodiments thereof, but it will be understood that variations and modifications can be effected within the spirit and scope of the invention.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

| PARTS LIST | |
|---|---|
| 10 | first region |
| 11 | second region |
| 12 | cross-section line |
| 13 | ink bleed artifacts |
| 20 | black input image cross-section |
| 21 | cyan input image cross-section |
| 30 | low-pass convolution filter |
| 32 | low-pass filtered black image cross-section |
| 40 | hi-pass convolution filter |
| 42 | hi-pass filtered black image cross-section |
| 50 | input digital image |
| 51 | black color channel |
| 52 | additional color channels |
| 53 | convolution operation |
| 54 | filtered black color channel |
| 55 | form modified additional color channels step |
| 56 | modified additional color channels |
| 57 | modified digital image |

-continued

PARTS LIST

| | |
|---|---|
| 58 | color transform operation |
| 59 | form color dependent scale factor step |
| 60 | color dependent scale factor channel |
| 61 | compute total colorant amount step |
| 62 | compute volume tapering function step |
| 63 | compute ink adjustment factor step |
| 64 | compute edge tapering function step |
| 66 | compute scale factor step |
| 68 | multiplier |

The invention claimed is:

1. A method for modifying an input digital image having one or more color channels, each color channel having an (x,y) array of image pixel values, to form a modified digital image comprising the steps for:
   a) computing a transformed digital image responsive to the input digital image, wherein the transformed digital image contains at least a black color channel and one or more additional color channels, each such channel having pixel values;
   b) computing a color dependent scale factor channel responsive to the image pixel values of the transformed digital image to produce color dependent scale factor image pixel values;
   c) computing a filtered black color channel from the black color channel using a convolution operation to produce filtered black image pixel values; and
   d) forming the modified digital image by modifying image pixel values in one or more of the additional color channels of the transformed digital image in response to the corresponding color dependent scale factor image pixel values and the corresponding filtered black image pixel values, so that when the modified digital image is used to produce a printed image on an inkjet printer, there are reduced ink bleed artifacts, wherein the process of forming the modified digital image includes:
      i) determining pixel-dependent scale factor(s) for the one or more additional color channels in response to the corresnonding filtered black image pixel values and the color dependent scale factor; and
      ii) scaling the image pixel values for the one or more additional color channels using the pixel-dependent scale factor(s) to determine the modified image pixel values.

2. The method of claim 1 wherein the transformed digital image is computed using a multidimensional look-up table indexed by the image pixel values of the input digital image.

3. The method of claim 1 wherein the one or more additional color channels include a cyan, magenta, or yellow color channel.

4. The method of claim 1 wherein the convolution operation in step c) includes convolving the black color channel with a low-pass convolution filter to produce the filtered black image pixel values.

5. The method of claim 4 wherein the low-pass convolution filter is a box filter.

6. The method of claim 1 wherein the convolution operation in step c) includes convolving the black color channel with a hi-pass convolution filter to produce the filtered black image pixel values.

7. The method of claim 6 wherein the filtered black image pixel values are farther modified by an absolute value operation.

8. The method of claim 1 wherein the image pixel values of at least one of the additional color channels are modified to produce reduced ink amounts in image regions where the filtered black image pixel values are large, thereby producing reduced ink bleed artifacts.

9. The method of claim 1 wherein the color dependent scale factor (Q), is determined using the equation:

$$Q = \text{Clip}(S_1 = S_V(V_T), 0, 1)$$

where $V_T$ is a total colorant amount, $S_1$ is an ink adjustment factor, and $S_V()$ is a volume tapering function.

10. The method of claim 1 wherein the pixel-dependent scale factors ($S_A$), are determined using the equation:

$$S_A = 1 - Q \times S_E(K_f)$$

where $K_f$ is the filtered black image pixel value, Q is the color dependent scale factor, and $S_E()$ is an edge tapering function.

11. The method according to claim 1 wherein the pixel-dependent scale factor(s) are determined by addressing one or more look-up table(s) with the filtered black image pixel value.

12. The method of claim 1 wherein the color dependent scale factor is computed using a multidimensional look-up table indexed by the image pixel values of the transformed digital image.

13. The method according to claim 1 wherein the one or more modified color channels are determined by using a functional relationship having inputs including the corresponding image pixel values of the one or more additional color channels, the color dependent scale factor, and the filtered black image pixel values.

14. The method according to claim 1 further including:
   e) forming a second filtered color channel from one or more of the additional color channels using a convolution operation; and
   f) forming a modified black color channel for the modified digital image by modifying the black image pixel values in response to the corresponding image pixel values of the second filtered color channel.

15. The method according to claim 14 wherein the convolution operation in step e) includes convolving at least one of the additional color channels with a low-pass convolution filter.

16. The method according to claim 15 wherein the low pass convolution filter is a box filter.

17. The method according to claim 16 wherein the convolution operation in step e) includes convolving at least one of the additional color channels with a hi-pass convolution filter.

18. The method according to claim 16 wherein step e) includes filtering two or more of the additional color channels using a convolution operation to form filtered additional color channels and combining the filtered additional color channels to fonn the second filtered color channel.

19. The method according to claim 18 wherein the filtered additional color channels are combined by summing the filtered additional color channels.

20. The method according to claim 18 wherein the filtered additional color channels are combined by determining the maximum value of filtered additional color channel.

21. The method according to claim 14 wherein step e) includes combining two or more of the additional color channels to form a combined color channel and filtering the combined color channel to form the second filtered color channel.

22. The method according to claim 1 wherein only regions of the input digital image containing text, graphics, or both are modified.

23. The method according to claim 22 wherein an automatic detection algorithm is used to detect text and graphics regions of the input digital image.

24. A method for modifying an input digital image having one or more color channels, each color channel having an (x,y) array of image pixel values, to form a modified digital image comprising the steps for:
- a) computing a transformed digital image responsive to the input digital image, wherein the transformed digital image contains at least a black color channel, one or more additional color channels, and a color dependent scale factor channel, each such channel having pixel values;
- b) terming a filtered black color channel from the black color channel using a convolution operation; and
- c) forming the modified digital image by modifying image pixel values in one or more of the additional color channels of the transformed digital image in response to the corresponding color dependent scale factor image pixel values and the corresponding filtered black image pixel values, so that when the modified digital image is used to produce a printed image on an inkjet printer there are reduced ink bleed artifacts, wherein the process of forming the modified digital image includes:
  - i) determining pixel-dependent scale factor(s) for the one or more additional color channels in response to the corresponding filtered black image pixel values and the color dependent scale factor; and
  - ii) scaling the image pixel values for the one or more additional color channels using the pixel-dependent scale factor(s) to determine the modified image pixel values.

25. The method of claim 24 wherein the color dependent scale factor is computed using a multidimensional look-up table indexed by the image pixel values of the input digital image.

26. A method for modifying an input digital image having at least a black color channel and one or more additional color channels, each color channel having an (x,y) array of image pixel values, to form a modified digital image comprising the steps for:
- a) computing a color dependent scale factor channel having color dependent scale factor image pixel values responsive to the image pixel values of the input digital image;
- b) computing a filtered black color channel from the black color channel using a convolution operation to produce filtered black image pixel values; and
- c) forming the modified digital image by modifying image pixel values in one or more of the additional color channels in response to the corresponding color dependent scale factor image pixel values and the corresponding filtered black image pixel values, so that when the modified digital image is used to produce a printed image on an inkjet printer there are reduced ink bleed artifacts, wherein the process of forming the modified digital image includes:
  - i) determining pixel-dependent scale factor(s) for the one or more additional color channels in response to the corresponding filtered black image pixel values and the color dependent scale factor; and
  - ii) scaling the image pixel values for the one or more additional color channels using the pixel-dependent scale factor(s) to determine the modified image pixel values.

27. A computer-readable storage medium storing a computer-executable program which, when executed, causes a computer to perform the method of claim 1.

28. A method for modifying an input digital image having one or more color channels, each color channel having an (x,y) array of image pixel values, to form a modified digital image comprising the steps for:
- a) computing a transformed digital image responsive to the input digital image, wherein the transformed digital image contains at least a black color channel and one or more additional color channels, each such channel having pixel values;
- b) computing a color dependent scale factor channel responsive to the image pixel values of the transformed digital image to produce color dependent scale factor image pixel values;
- c) computing a filtered black color channel from the black color channel using a convolution operation to produce filtered black image pixel values, wherein the convolution operation includes convolving the black color channel with a hi-pass convolution filter to produce the filtered black image pixel values; and
- d) forming the modified digital image by modifying image pixel values in one or more of the additional color channels of the transformed digital image in response to the corresponding color dependent scale factor image pixel values and the corresponding filtered black image pixel values, so that when the modified digital image is used to produce a printed image on an inkjet printer, there are reduced ink bleed artifacts.

29. A method for modifying an input digital image having one or more color channels, each color channel having an (x,y) array of image pixel values, to form a modified digital image comprising the steps for:
- a) computing a transformed digital image responsive to the input digital image, wherein the transformed digital image contains at least a black color channel and one or more additional color channels, each such channel having pixel values;
- b) computing a color dependent scale factor channel responsive to the image pixel values of the transformed digital image to produce color dependent scale factor image pixel values;
- c) computing a filtered black color channel from the black color channel using a convolution operation to produce filtered black image pixel values; and
- d) forming the modified digital image by modifying image pixel values in one or more of the additional color channels of the transformed digital image in response to the corresponding color dependent scale factor image pixel values and the conesponding filtered black image pixel values, so that when the modified digital image is used to produce a printed image on an inkjet printer, there are reduced ink bleed artifacts, wherein the image pixel values of at least one of the additional color channels are modified to produce reduced ink amounts in image regions where the filtered black image pixel values are large, thereby producing reduced ink bleed artifacts.

* * * * *

UNITED STATES PATENT AND TRADEMARK OFFICE
CERTIFICATE OF CORRECTION

PATENT NO. : 7,652,795 B2  Page 1 of 1
APPLICATION NO. : 11/295217
DATED : January 26, 2010
INVENTOR(S) : Douglas W. Couwenhoven It is certified that error appears in the above-identified patent and that said Letters Patent is hereby corrected as shown below:

| Column | Line | |
|---|---|---|
| 11 | 43 | In Claim 1, delete "corresnonding" and insert -- corresponding --, therefor. |
| 11 | 66 | In Claim 7, delete "farther" and insert -- farther --, therefor. |
| 12 | 8 | In Claim 9, delete "Q=Clip(S1=SV(VT),0,1)" and insert -- Q = Clip(SI × SV(VT),0,1) --, therefor. |
| 12 | 53 | In Claim 18, delete "fonn" and insert -- form --, therefor. |
| 13 | 15 | In Claim 24, delete "terming" and insert -- forming --, therefor. |
| 14 | 41 | In Claim 29, delete "channcl" and insert -- channel --, therefor. |
| 14 | 55 | In Claim 29, delete "conesponding" and insert -- corresponding --, therefor. |

Signed and Sealed this

Sixteenth Day of November, 2010

David J. Kappos
*Director of the United States Patent and Trademark Office*